No. 808,303. PATENTED DEC. 26, 1905.
C. M. PALMER.
DIRECT INTERMITTENT CURRENT ELECTRIC MOTOR.
APPLICATION FILED DEC. 17, 1902.

Attest:
Parker Sweet Jr.
B. L. Chadwell.

Inventor:
Chester M. Palmer
By Nowell Bartle
Associate Attorney.

UNITED STATES PATENT OFFICE.

CHESTER M. PALMER, OF AURORA, ILLINOIS.

DIRECT INTERMITTENT CURRENT ELECTRIC MOTOR.

No. 808,303.　　　　　Specification of Letters Patent.　　　　　Patented Dec. 26, 1905.

Application filed December 17, 1902. Serial No. 135,657.

*To all whom it may concern:*

Be it known that I, CHESTER M. PALMER, a citizen of the United States, residing at Aurora, in the county of Kane and State of Illinois, have invented a certain new and useful Direct Intermittent Current Electric Motor, of which the following is a specification.

This invention relates to an intermittent-current electric motor in which the armature is moved by a shifting magnetic field produced by changes of magnetism acting successively or dissimultaneously in different portions of the field. This requires the electric changes which produce the magnetic changes to be correspondingly successive or displaced in character; and the object of my invention is to produce such lagging or displacement without the use of more than one supply-current.

Figure 1:
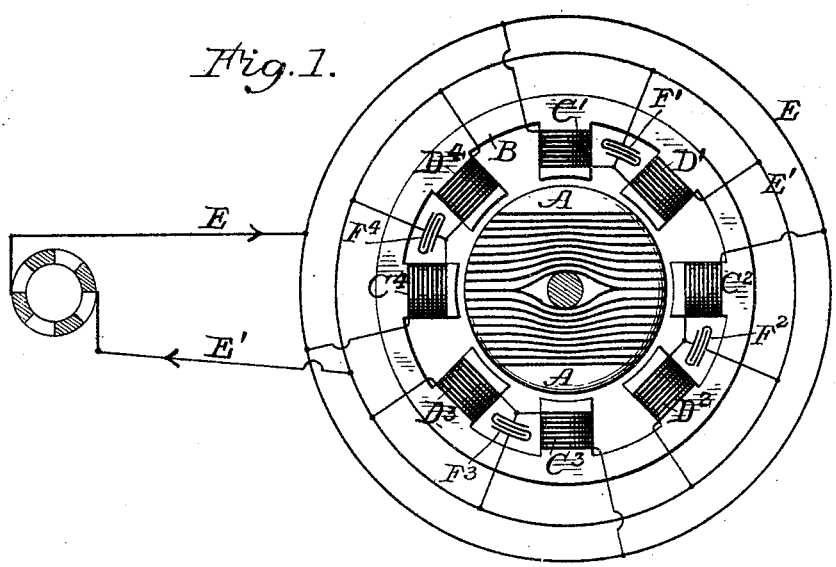
Figure 2:
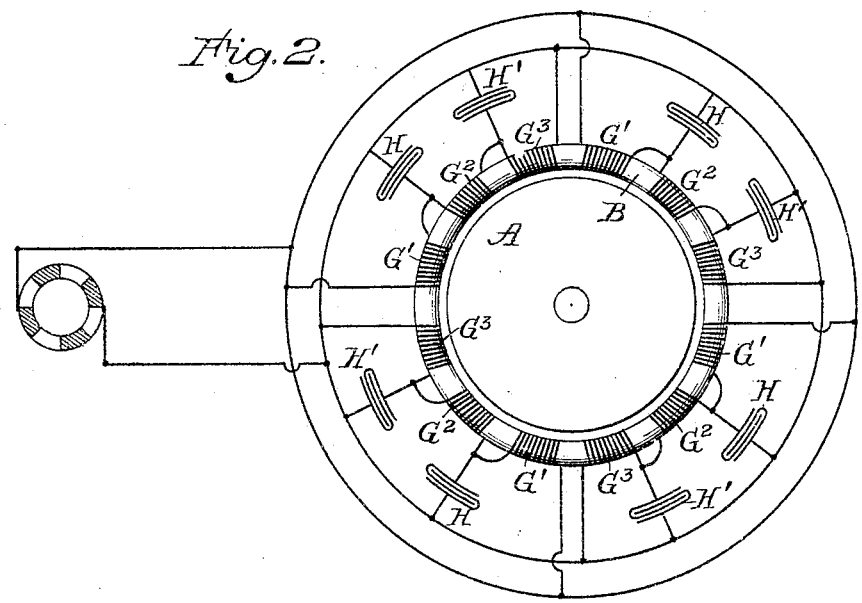

In the accompanying drawings, Figure 1 is a diagrammatic illustration of a motor embodying my invention; and Fig. 2 is a similar view of a motor embodying my invention, in which the field-magnet is of the ring type.

In a motor embodying my invention the armature A may be of any desired form or construction; but I prefer to employ an armature having a core of laminated iron and an exterior winding, the coils of which are in closed circuit. The field-magnet B may also be of any suitable type; but, as shown in Fig. 1, said magnet is of the annular type, having inwardly-projecting pole-pieces on which are wound four sets of series-connected coils, each set comprising two similarly-wound coils $C'$ and $D'$, $C^2$ and $D^2$, $C^3$ and $D^3$, and $C^4$ and $D^4$. These sets of coils are connected in parallel with the wires E and E' of a direct intermittent electric circuit, all of the field-coils being therefore connected in multiple series. One of the coils in each set of series-connected coils is shunted by a condenser, the coil $D'$ being shunted by the condenser $F'$, the coil $D^2$ by the condenser $F^2$, the coil $D^3$ by the condenser $F^3$, and the coil $D^4$ by the condenser $F^4$, said condensers having a value or capacity which will effect approximately one-quarter of a phase difference of current-wave between the series-connected coils.

The rotation of the armature is effected by the successive excitation of the pole-pieces of the series-connected coils. The impulses of electric current from the wire E pass through the parallel-connected coils $C'$, $C^2$, $C^3$, and $C^4$ to the condensers $F'$, $F^2$, $F^3$, and $F^4$, which virtually shunt the coils $D'$, $D^2$, $D^3$, and $D^4$. At about the completion of the current-wave the self-induction of the shunted coils $D'$, $D^2$, $D^3$, and $D^4$, which opposed the passage of the current and caused the condensers to charge, will fall off and cause the condensers to discharge through the shunted coils, the development of magnetic force by the coils $D'$, $D^2$, $D^3$, and $D^4$ being thereby caused to lag behind the same development in the coils $C'$, $C^2$, $C^3$, and $C^4$, the result being a shifting of magnetism from one pole to another and a successive inductive influence on the armature to cause it to rotate.

In Fig. 2 I have diagrammatically illustrated a motor having a ring-field, the coils being wound thereon and connected in multiple series, as before described. In this instance I show three coils $G'$, $G^2$, and $G^3$ in each set of series-connected coils, the coils $G^2$ and $G^3$ of each series being shunted by condensers H and H' to produce the necessary lag in the development of magnetic force, as will be readily understood.

Having thus described my invention, what I claim as new, and desire to secure by Letters Patent, is—

In a direct intermittent electric current motor, an armature, a plurality of field-coils arranged in inductive relation to different portions of the armature, said coils being connected in multiple series, and one or more coils in each set of series-connected coils being shunted by a condenser whereby the current therein will be displaced or retarded.

CHESTER M. PALMER.

Witnesses:
　G. W. KIMBALL,
　F. F. FERRIER.